Figure 1:
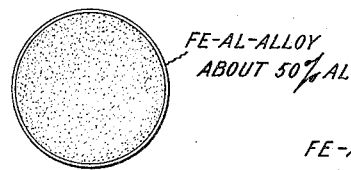

W. E. RUDER.
PROCESS OF TREATING METALS.
APPLICATION FILED JULY 10, 1918.

1,346,062. Patented July 6, 1920.

Inventor:
William E. Ruder,
by Albert G. Davis
His Attorney.

UNITED STATES PATENT OFFICE.

WILLIAM E. RUDER, OF SCHENECTADY, NEW YORK, ASSIGNOR TO GENERAL ELECTRIC COMPANY, A CORPORATION OF NEW YORK.

PROCESS OF TREATING METALS.

1,346,062.  Specification of Letters Patent.  Patented July 6, 1920.

Application filed July 10, 1918. Serial No. 244,166.

*To all whom it may concern:*

Be it known that I, WILLIAM E. RUDER, a citizen of the United States, residing at Schenectady, in the county of Schenectady, State of New York, have invented certain new and useful Improvements in Processes of Treating Metals, of which the following is a specification.

My invention relates to the art of treating metals so as to protect them against the effects of oxidization and other corrosive agencies and has for its object the provision of a condition of the metal such that it is capable of withstanding the oxidizing and corrosive influence without harmful effect.

My invention relates more specifically to the treatment of metals which oxidize readily, such as iron, copper and the like. As is well known copper oxidizes very rapidly particularly at high temperatures. Iron at a moderate temperature oxidizes slowly, if unprotected, but at a high temperature the oxidization is so rapid as to render its use almost prohibitive.

In a patent issued to T. Van Aller No. 1,155,974, dated Oct. 5, 1915, there is described and claimed an oxidizable metal having its surface alloyed with another metal to form an alloy which is inoxidizable at high temperatures, and a particular process whereby the metal is produced is also described and claimed in this patent. There is also a Patent No. 1,091,057, dated March 24, 1914, to E. G. Gilson, in the nature of an improvement on the Van Aller process. Generally speaking the process described in these patents consists in heating the metal under non-oxidizing conditions in contact with a powdered material, such as aluminum. This process produces in the metal, principally at its surface, an alloy of aluminum, and the metal which protects the metal so that it will withstand a high temperature almost indefinitely. It has been found that continued heating of the treated metal at a high temperature tends to diffuse the aluminum into the metal thereby weakening the concentration at the surface. If the layer of alloy on its surfaces is very heavy and the section of metal relatively thin then the aluminum diffuses inward to the middle from both sides, but the concentration remains heavy enough at the surface to prevent oxidization. In cases, however, where the section of metal to be treated is relatively thick or where a thick layer of alloy has not been formed, the diffusion inward weakens the outer portion so that it will not resist high temperature to the same degree that it did originally.

I have found that this can be overcome and the metal rendered proof against temperatures which approximate the melting point regardless of the size of the object treated. This I accomplish by a preliminary diffusing of aluminum throughout the metal to be treated, and then treating by the process described in the above mentioned patents. In some cases the diffusion may be accomplished by introducing a certain amount of aluminum into the metal, as for instance, in casting. This is not practicable, however, except in the case of cast parts and even then the aluminum may make the parts so hard and brittle they cannot be machined. I prefer, therefore, to introduce the aluminum into the metal by a preliminary treatment in accordance with the process described in the patents above referred to. After the metal is treated in this way, it is heated for several hours at a high temperature to diffuse the aluminum through the metal. A temperature of 1000° C. for about 6 hours has been found to produce satisfactory results. The metal is then treated again in substantially the same way after which the metal is ready for use.

Figure 2:
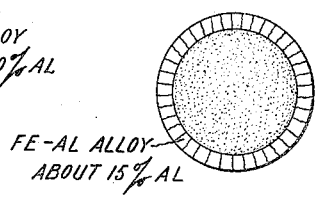
Figure 3:
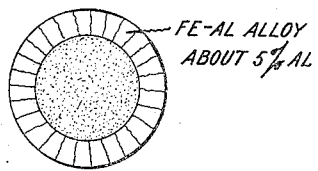
Figure 4:
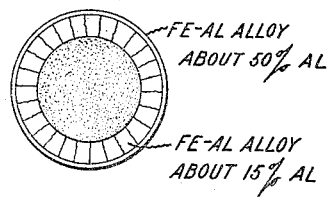
Figure 5:
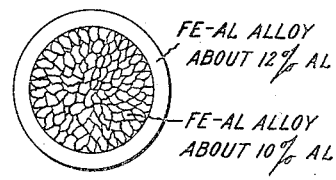

In the accompanying drawing, Figures 1 to 5 represent various stages in the process. Fig. 1 indicates an article which has been treated in the usual way so as to produce an alloy of aluminum and iron at the surface to a thickness of about .002–.010 inches, the percentage of aluminum in the alloy being about 50%. Fig. 2 represents the article after high temperature heating such as it would obtain in service. In this case the percentage of aluminum in the alloy is about 15%. Fig. 3 shows the diffusion after long service. In this case the percentage of aluminum in the alloy is about 5%, being too dilute to properly protect the surface. Fig. 4 shows the article again treated to enrich the surface with aluminum. In this case the alloy at the surface contains about 50% aluminum whereas the inside of this outer ring contains about 15% of aluminum. Fig. 5 shows the article after further heating. The outer ring of the alloy now contains about 12% of aluminum and the remainder of the article about 10%. It will be understood, of course, that these figures are merely given to illustrate various stages in the process and that the percentages are not intended to be exact.

While I have described one concrete embodiment of my invention in accordance with the provisions of the patent statutes it should be understood that I do not limit my invention thereto as various modifications thereof will suggest themselves to those skilled in the art without departing from the spirit of my invention the scope of which is set forth in the annexed claims.

What I claim as new and desire to secure by Letters Patent of the United States, is:—

1. The process of treating metals to render them inoxidizable at high temperatures which consists in diffusing into the metal another metal which forms an inoxidizable alloy with it, and then heating the metal under non-oxidizing conditions in the presence of the other metal to form the inoxidizable alloy at the surface.

2. The process of treating metals to render them inoxidizable at high temperatures which consists in diffusing aluminum into the metal and then heating the metal under non-oxidizing conditions in the presence of aluminum.

3. The process of treating metals to render them inoxidizable at high temperatures which consists in heating the metal under non-oxidizing conditions in contact with aluminum powder to cause the aluminum to alloy with the metal at its surface, heating the metal to cause the aluminum to diffuse into the metal and then again heating in contact with aluminum powder to cause a concentration of the aluminum alloy at the surface.

4. As an article of manufacture, an oxidizable metal having at its surface an alloy of aluminum with the metal and aluminum diffused uniformly throughout the body of the metal but in smaller percentage than at the surface.

In witness whereof, I have hereunto set my hand this 8th day of July 1918.

WILLIAM E. RUDER.